(12) United States Patent
Zhang et al.

(10) Patent No.: US 11,047,228 B2
(45) Date of Patent: Jun. 29, 2021

(54) PREDICTING CARBONATE POROSITY BASED ON PETROGRAPHIC DATA

(71) Applicant: Saudi Arabian Oil Company, Dhahran (SA)

(72) Inventors: Shuo Zhang, Houston, TX (US); Peng Lu, Dammam (SA); Dave Cantrell, Dhahran (SA); Tiffany Dawn McAlpin, Richmond, TX (US); Susan Agar, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 286 days.

(21) Appl. No.: 16/165,434

(22) Filed: Oct. 19, 2018

(65) Prior Publication Data
US 2020/0123898 A1 Apr. 23, 2020

(51) Int. Cl.
E21B 49/00 (2006.01)
E21B 44/00 (2006.01)
G01V 99/00 (2009.01)

(52) U.S. Cl.
CPC ............ E21B 49/00 (2013.01); E21B 44/00 (2013.01); G01V 99/005 (2013.01); G01V 2210/6244 (2013.01)

(58) Field of Classification Search
CPC ....... E21B 49/00; E21B 44/00; G01V 99/005; G01V 2210/6244
USPC .......................................................... 703/10
See application file for complete search history.

(56) References Cited

U.S. PATENT DOCUMENTS

| 4,542,648 | A  | 9/1985  | Vinegar et al. |
| 6,088,656 | A  | 7/2000  | Ramakrishnan et al. |
| 6,229,308 | B1 | 5/2001  | Freedman |
| 6,977,499 | B2 | 12/2005 | Kiesl et al. |
| 6,987,385 | B2 | 1/2006  | Akkurt et al. |
| 7,363,158 | B2 | 4/2008  | Stelting et al. |
| 7,970,545 | B2 | 6/2011  | Sanstrom |
| 8,385,604 | B2 | 2/2013  | Orpen |
| 8,605,951 | B2 | 12/2013 | Baggs et al. |

(Continued)

FOREIGN PATENT DOCUMENTS

CN 106841001 A * 6/2017

OTHER PUBLICATIONS

Goldhammer, R. K. "Compaction and decompaction algorithms for sedimentary carbonates." Journal of Sedimentary Research 67.1 (1997). pp. 26-35. (Year: 1997).*

(Continued)

Primary Examiner — Kamini S Shah
Assistant Examiner — John E Johansen
(74) Attorney, Agent, or Firm — Fish & Richardson P.C.

(57) ABSTRACT

Petrographic data of a carbonate reservoir in a subterranean region is received. Mud content of the carbonate reservoir is determined based on the petrographic data. A depositional porosity of the carbonate reservoir is computed based on the mud content. An amount of cementation of the carbonate reservoir is determined. A porosity loss by compaction of the carbonate reservoir is determined based on the mud content and the amount of cementation of the carbonate reservoir. A post-compaction porosity of the carbonate reservoir is computed based on the depositional porosity, the mud content, the amount of cementation, and the porosity loss by compaction.

17 Claims, 12 Drawing Sheets
(10 of 12 Drawing Sheet(s) Filed in Color)

(56) References Cited

U.S. PATENT DOCUMENTS

| | | | |
|---|---|---|---|
| 9,081,117 B2 | 7/2015 | Wu et al. | |
| 2007/0239359 A1 | 10/2007 | Stelting et al. | |
| 2010/0135536 A1* | 6/2010 | Dvorkin | G01N 23/046 382/109 |
| 2010/0198638 A1 | 8/2010 | Deffenbaugh et al. | |
| 2010/0305927 A1 | 12/2010 | Suarez-Rivera et al. | |
| 2011/0270594 A1* | 11/2011 | Rudnicki | G01V 99/00 703/2 |
| 2012/0221306 A1 | 8/2012 | Hurley et al. | |
| 2013/0080133 A1 | 3/2013 | Sung et al. | |
| 2013/0140031 A1 | 6/2013 | Cohen et al. | |
| 2013/0259190 A1 | 10/2013 | Walls et al. | |
| 2013/0297272 A1 | 11/2013 | Sung et al. | |
| 2014/0067351 A1* | 3/2014 | Gray | G01V 99/005 703/6 |

OTHER PUBLICATIONS

Ehrenberg, S. N. "Assessing the relative importance of compaction processes and cementation to reduction of porosity in sandstones: discussion; compaction and porosity evolution of Pliocene sandstones, Ventura Basin, California: discussion." AAPG bulletin 73.10 (1989). pp. 1274-1276. (Year: 1989).*

Wang, Dayong, Yongchen Song, and Minglong Zhao. "Influence of the volume loss of framework grains on the quantitative analysis of diagenetic modification of the original intergranular porosity." Marine and petroleum geology 30.1 (2012). pp. 26-31. (Year: 2012).*

Brown, "Posity Variation in Carbonates as a Function of Depth: Mississippian Madison Group, Williston Basin," Chapter 3, found in Kupecz et al., Reservoir quality prediction in sandstones and carbonates, AAPG Memoir 69, Jan. 1, 1997, 8 pages.

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

Enos and Sawatsky, "Pore networks in holocene carbonate sediments," Journal of Sedimentary Research vol. 51, Issue 3, Jan. 1981, 26 pages.

Gaillot et al.; "Contribution of Borehole Digital Imagery in Core-Logic-Seismic Integration"; Scientific Drilling, No. 5; Sep. 2007; pp. 50-53.

Lander and Walderhaug, "Predicting Porosity through Simulating Sandstone Compaction and Quartz Cementation," AAPG Bulletin, vol. 83, No. 3, Mar. 1999, 17 pages.

Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.

Schmoker, "Empirical Relation Between Carbonate Porosity and Thermal Maturity: An Approach to Regional Porosity Prediction," The American Association of Petroleum Geologists, vol. 68, No. 11, Nov. 1984, 7 pages.

Teagle et al.; "Methods" Proceedings of the Integrated Ocean Drilling Program, vol. 309/312; Published in 2006; pp. 1-70.

WellCAD Software, "4.4 Book 1—Basics," V2011.10.17, ALT, Oct. 17, 2011, 11 pages.

Wilkens et al.; "Data Report: Digital Core Images as Data: An Example from IODP Expedition 303"; Proceedings of the Integrated Ocean Drilling Program, vol. 303/306; Published in 2009; pp. 1-16.

Zhang et al., "Modeling carbonate diagenesis for reservoir quality prediction: Predicting cementation and compaction from mud content using petrographic data from carbonate reservoir in a giant oil field," AAPG, Aug. 3, 2016, 1 page.

PCT International Search Report and Written Opinion of the International Searching Authority issued in International Application No. PCT/US2015/022492 dated Aug. 4, 2015; 11 pages.

Office Action issued in GCC Application No. 2015/29123 dated Jan. 10, 2018; 5 pages.

International Search Report and Written Opinion issued in International Application No. PCT/US2019/056270 dated Nov. 29, 2019, 17 pages.

GCC Examination Report in Gulf Cooperation Council Appln. No. GC 2019-38490, dated Nov. 15, 2020, 4 pages.

* cited by examiner

PREDICTING CARBONATE POROSITY BASED ON PETROGRAPHIC DATA

BACKGROUND

Accurate prediction of reservoir quality helps hydrocarbon exploration and development. Conventional geological approaches for predicting porosity and permeability in reservoirs prior to drilling include a process-oriented, a purely empirical or statistical, or a hybrid approach. In mature hydrocarbon fields, a large number of cores and logs can provide sufficient data for algorithm development and calibration. As such, empirical approaches may be better than the process-oriented approaches in terms of prediction accuracy. However, in undrilled basins or areas with insufficient drilling data, certain aspects of process-based theoretical relationships are required to make reservoir quality predictions.

SUMMARY

The present disclosure describes predicting carbonate porosity based on petrographic data.

In an implementation, a computer-implemented method for predicting porosity of a carbonate reservoir includes the following operations. A data processing apparatus receives petrographic data of a carbonate reservoir in a subterranean region. The data processing apparatus determines mud content of the carbonate reservoir based on the petrographic data. The data processing apparatus determines a depositional porosity of the carbonate reservoir based on the mud content. The data processing apparatus determines an amount of cementation of the carbonate reservoir. The data processing apparatus determines a porosity loss by compaction of the carbonate reservoir based on the mud content and the amount of cementation of the carbonate reservoir. The data processing apparatus determines a post-compaction porosity of the carbonate reservoir based on the depositional porosity, the mud content, the amount of cementation, and the porosity loss by compaction.

Implementations of the described subject matter, including the previously described implementation, can be implemented using a computer-implemented method, a non-transitory, computer-readable medium or a computer-implemented system. The medium can store computer-readable instructions to perform the computer-implemented method. The system can include one or more computer memory devices interoperably coupled with one or more computers and with the computer-readable medium.

The subject matter described in this specification can be implemented in particular implementations so as to realize one or more of the following advantages. The described methodology can improve accuracy of quality prediction of carbonate reservoirs. For example, the described methodology can predict porosity of a carbonate reservoir before drilling wells of a well system in a carbonate reservoir for hydrocarbon production. The output from the described methodology can be used in decision making of drilling locations. As such, the described methodology can help save cost, enhance effectiveness, and increase production of a well system for hydrocarbon production.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

The patent or application file contains at least one color drawing executed in color. Copies of this patent application publication with color drawings(s) will be provided by the Patent and Trademark Office upon request and payment of the necessary fee.

Like reference numbers and designations in the various drawings indicate like elements.

DETAILED DESCRIPTION

Figure 1:
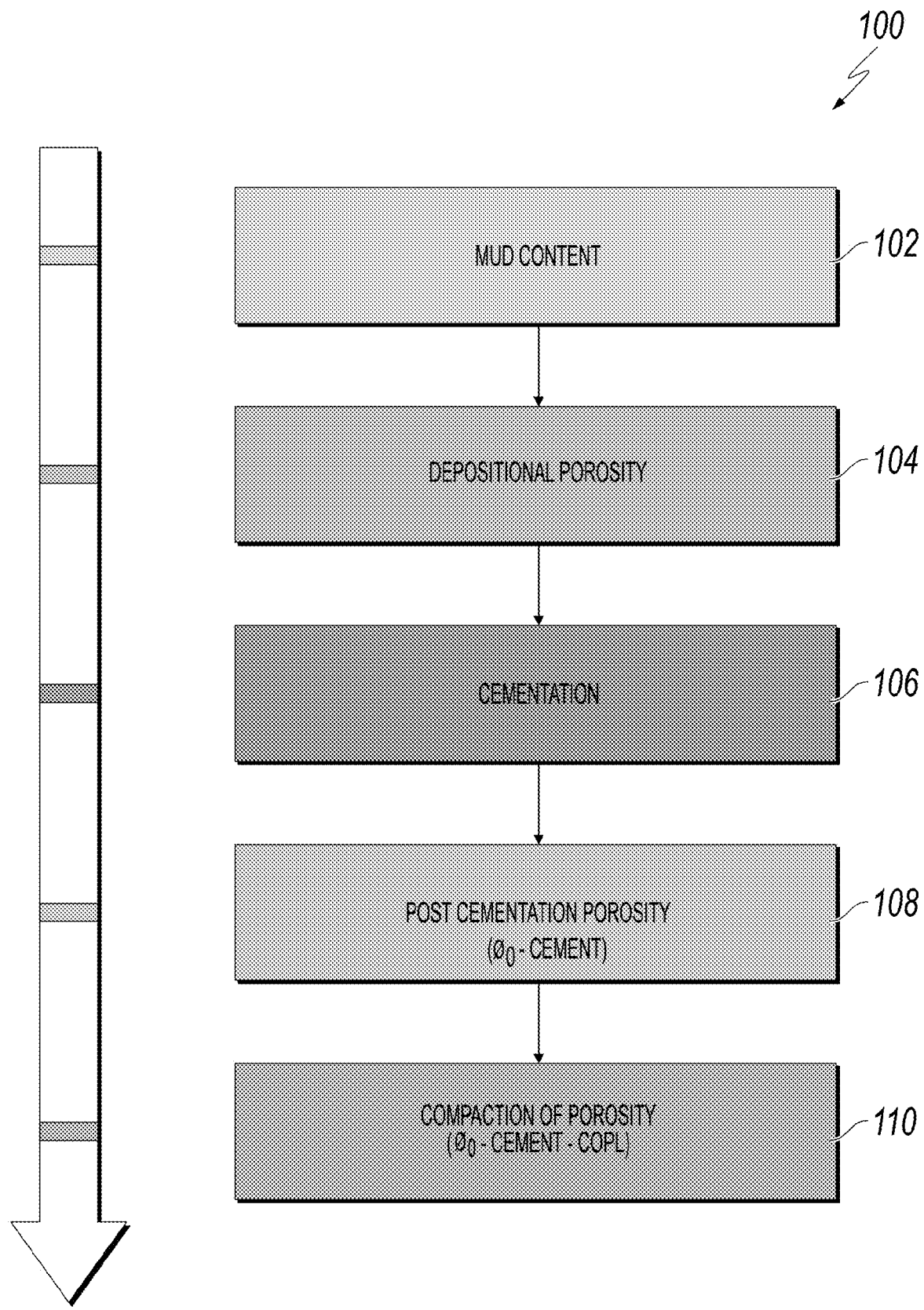
FIG. 1 is a block diagram illustrating an example model for predicting porosity of carbonate rocks, according to an implementation of the present disclosure.

The following detailed description describes predicting carbonate porosity based on petrographic data, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Accurate prediction of reservoir quality helps hydrocarbon exploration and development. Conventional geological approaches for predicting porosity and permeability in reservoirs prior to drilling include a process-oriented, a purely empirical or statistical, or a hybrid approach. In mature hydrocarbon fields, a large number of cores and logs can provide sufficient data for algorithm development and calibration. As such, empirical approaches may be better than the process-oriented approaches in terms of prediction accuracy. However, in undrilled basins or areas with insufficient drilling data, certain aspects of process-based theoretical relationships are required to make reservoir quality predictions.

Existing predictive tools such as EXEMPLAR (by Geologica Inc, Berkeley, Calif., USA) and TOUCHSTONE (by Geocosm, LLC, Durango, Colo., USA) are based on an approach that employs empirically calibrated parameters but explicitly calculates compaction and cementation processes with time and burial. For example, EXEMPLAR considers only compaction and quartz cementation in burial diagenesis and can predict quality of sandstone reservoirs reasonably well. However, conventional techniques used for predicting porosity in sandstone reservoirs may not work well for the carbonate reservoirs. For sandstones, the porosity is dominantly controlled by compaction and quartz cementation. In carbonate reservoirs, intensive syndepositional and post-depositional diagenesis drive modifications in reservoir quality, generating more complicated porosity types than clastic rocks (or clastics). The greater variety of porosity types in carbonate rocks/sediments (or carbonates) relative to clastics adds more complexity for the task of predicting porosity of carbonate reservoirs.

Example techniques are described for reservoir quality prediction, including predicting porosity of carbonates. For example, the described techniques can predict interparticle porosity of carbonate rocks based on petrographic data. The described techniques can model diagenetic processes in carbonate rocks for reservoir quality prediction of the carbonate rocks. Compared to conventional techniques, the described techniques build models accounting for various factors that can improve prediction accuracy of quality of the carbonate reservoirs. For example, in terms of stages, the proposed models take into account early diagenesis, both marine and meteoric, along with late burial diagenesis. Diagenesis is the change of sediments or existing sedimentary rocks into a different sedimentary rock during and after rock formation (lithification), at temperatures and pressures less than that required for the formation of metamorphic rocks. In terms of diagenetic processes, rather than quartz cementation, the proposed models can take into account carbonate dissolution, cementation, recrystallization, micritization, and dolomitization. In some implementations, the proposed models can take into account every possible combination of the diagenetic stages, processes, and porosity types.

In some implementations, the described techniques use mud content as the primary variable to calculate carbonate rock porosity. In some implementations, the described techniques can predict interparticle porosity of carbonate rocks taking into account initial depositional porosity, cementation, and compaction. As cementation and compaction are considered the primary processes for porosity reduction, some implementations of the described techniques calculate initial depositional porosity from mud content based on an empirical relation and then calculate porosity reduced by cementation and compaction values.

In at least one implementation, the described techniques have been applied to a petrographic database including petrographic data from 635 samples in 15 wells from a carbonate reservoir in Eastern Saudi Arabia. The built models can be applied to all carbonate facies and pore types. Simulation results of the described techniques show that cements and mud may inhibit compaction and protect carbonate rocks from losing porosity.

Carbonate diagenesis can be generally divided into early diagenesis (meteoric and marine) and late burial diagenesis. In carbonate rocks, diagenesis is much more complicated than in sandstones in terms of intensity, timing, duration, and interactions of various processes involved. For example, carbonate rocks are particularly susceptible to drastic early diagenetic modification. As a result, modeling of compaction and cementation processes separately may not be able to model the carbonate diagenesis accurately. Sometimes diagenetic processes are associated with uplift and erosion. It has been found that abundant cementation of carbonate rocks occurs in hydro-tectonic burial realms (for example, passive-margin burial, pull-apart burial, collision margin burial, and post-orogenic burial).

Porosity of carbonate rocks can be a function of temperature, where a higher temperature generally results in lower carbonate porosity. Porosity of carbonate rocks can also be considered as a function of time. In an example implementation, the formation of carbonate rocks is modeled by three steps: 1) initial depositional porosity; 2) cementation; and 3) compaction. In some implementations, it is assumed that cementation precedes compaction. As such, porosity is subject to decrease by the volume of cement, and then decrease by compaction. Petrographic observations show that the cement within limestones in carbonate reservoirs are predominantly marine phreatic and meteoric phreatic. Late burial diagenesis cement is not commonly observed.

Mathematical models for effects of mud content on depositional porosity, cementation, and compaction can be developed based on petrographic studies of quantitative data of porosity, cement, and mud content of a carbonate reservoir. In some implementations, the mathematical models can be built based on a large number of thin sections of core plugs in the carbonate reservoir. For example, in a study of a carbonate reservoir in Eastern Saudi Arabia, a total of 635 thin section samples from 15 wells were selected. A quantitative estimation of particle type, authigenic constituents, porosity, and cement types can be obtained by point counting. Point counting is a method for estimating the composition of rocks based on identifying the mineral or grain present at a large number (in terms of multiple hundreds or more) of points in a thin section of the rock. Point counting can include a statistical method to quantitatively describe a thin section in an unbiased way. Point counting can be performed automatically (for example, by a software tool) or manually. In some implementations, a user (for example, a geoscientist or a petrography specialist) can view a thin section under a microscope. The microscope images of the thin section may show grains of varying sizes, overgrowths on those grains, overgrowths of different clays, (each of varying styles and habits), pore spaces between the grains, pores partially filled, grains partly dissolved, and so on. The user can look at a large number of points on the microscope images of thin sections, record what is seen at each point, and then assemble a description from all the information recorded. In order to be a statistically valid representation, the number of points is typically around 400-600. For example, in the previously described study, 400 and 600 points were counted along evenly spaced traverses across or down the length of all the thin sections.

In order to evaluate the intensity of cementation and compaction, it is desirable to have knowledge of a volume of intergranular space ($\phi_0$, also referred to as interparticle porosity, depositional porosity, or volume fraction) when the carbonate rocks are deposited. Porosities of carbonate rocks relate to depositional textures. In some instances, the muddiest sediments can have the highest porosities. In some instances, mud-free sediments, whose depositional texture corresponds to grainstone, have 40 to 50 percent porosity. The porosities of grain-supported sediments that contain some mud (that is, sedimentary equivalents of packstone) can range from 44 to 68 percent. Packstone's higher porosity than grainstone is likely due to the fact that packstone is mud-supported instead of grain-supported. If a packstone is considered as a completely grain-supported sediment with part of the intergranular space filled with mud, the porosity can be reduced from that of a mud-free grainstone of a comparable grain kind and size due to the occupation of mud in the pores. In some implementations, in order to actually increase the porosity, the small mud content may have to be concentrated at the points of grain contact and physically separate the grains (that is, the grains are "floating" in a muddy matrix).

FIG. 1 is a block diagram illustrating an example model 100 for predicting porosity of carbonate rocks, according to an implementation of the present disclosure. Model 100 illustrates evolution of the porosity of carbonate rocks through deposition, cementation, and compaction and uses a mud content 102 of the carbonate rocks as the primary variable for calculating porosity. Based on the mud content 102, an initial depositional porosity ($\phi_0$) 104 can be calculated. In some implementations, the depositional porosity ($\phi_0$) 104 can be calculated based on the mud content 102 according to an empirical relationship. In some implementations, the empirical relationship between the depositional porosity ($\phi_0$) 104 and the mud content 102 can be acquired, for example, by a data fitting described with respect to FIG. 2. Based on known empirical relationships of porosities of modern carbonate rocks with varying amount of mud content, the depositional porosity 104 can be calculated from the mud content 102.

Model 100 also considers effects of cementation 106 on the porosity of carbonate rocks. A post-cementation porosity 108 can be calculated as ($\phi_0$—Cement), where Cement represents an amount of cement (or an amount of cementation) in the carbonate rocks. In some implementations, the amount of cementation can be obtained from point counting data of carbonate samples of the carbonate rocks, and post-cementation porosity 108 can be calculated according to techniques described with respect to FIGS. 3 and 4.

Model 100 also considers effects of compaction on the porosity of carbonate rocks, such as calculated porosity loss by compaction (COPL). In some implementations, it is assumed that the porosity after cementation is subject to compaction. In some implementations, compaction of porosity 110 can be calculated as ($\phi_0$–Cement–COPL), described with respect to FIGS. 4 and 6.

Figure 2:
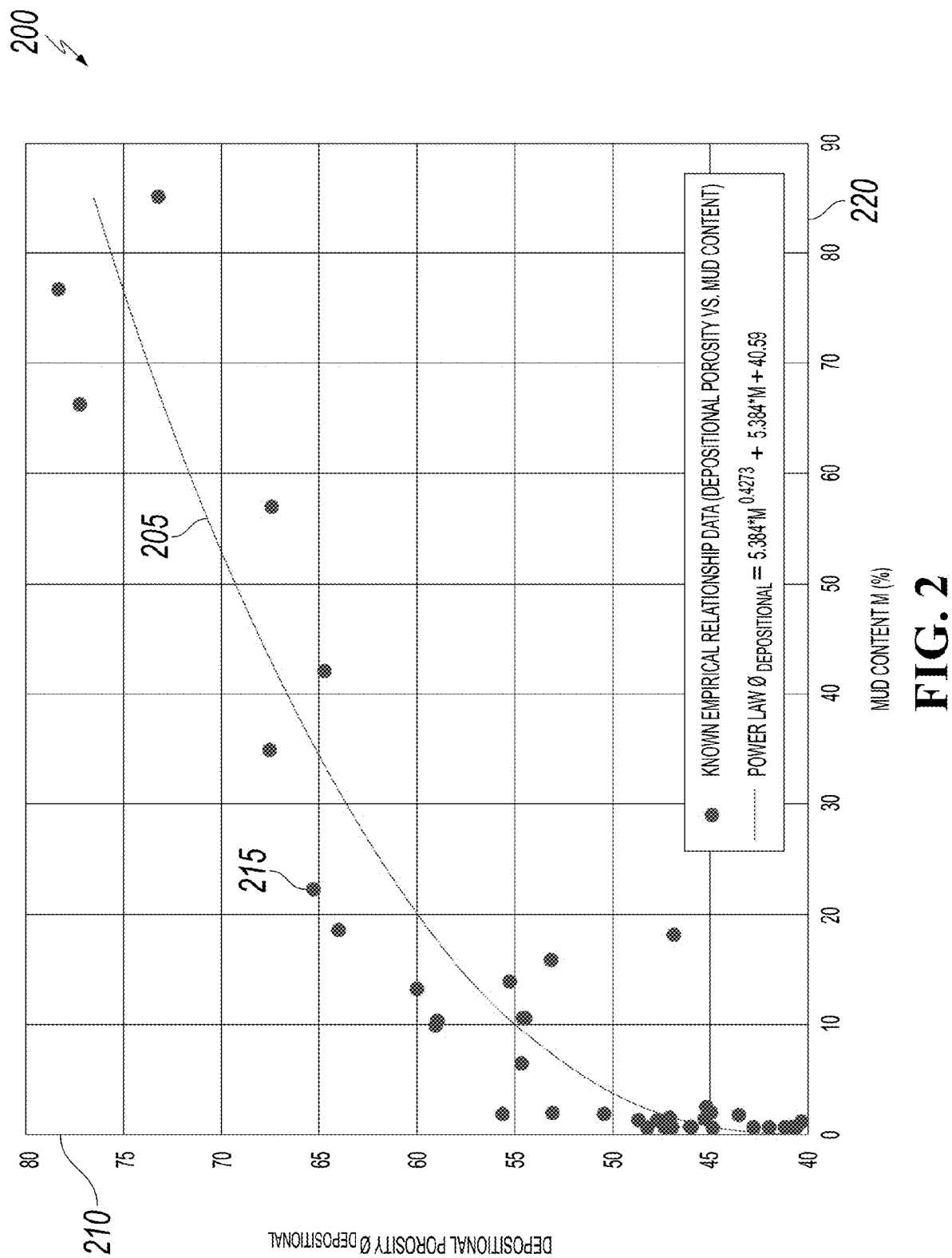
FIG. 2 is a data plot illustrating an example relationship between depositional porosity and mud content of carbonate rocks, according to an implementation of the present disclosure.

FIG. 2 is a data plot 200 illustrating an example relationship 205 between depositional porosity and mud content of carbonate rocks, according to an implementation of the present disclosure. The Y-axis 210 represents the depositional porosity (in percentage), denoted as $\phi_{depositional}$, while the X-axis 220 represents the mud content (in percentage), denoted by M. Example relationship 205 is obtained by a curve fitting of data 215 (reflecting known empirical relationships of porosities of modern carbonate rocks with varying amounts of mud content) according to a power law. The example relationship 205 is represented by a power law relationship, as represented by Equation (1):

$$\phi_{depositional} = 5.384 * M^{0.4273} + 40.59 \quad (1).$$

If a simple process of filling the intergranular pore space with mud is pursued (for example, by using porosity values obtained from two end members: grains with one porosity and mud with another porosity), the expected porosities in sediments with an increasing mud fraction can be calculated. It has been shown that the observed porosity trend can be fit relatively well by assuming the mixing of two end members, grains with 45% porosity and mud with 80% porosity. As such, the interparticle porosity of such carbonate rocks can be calculated according to Equation (2):

$$\phi_0 = 45(100-M) \quad (2).$$

The difference between depositional porosity ($\phi_{depositional}$) and interparticle porosity ($\phi_0$) is microporosity, which is the pore space in mud.

Figure 3:
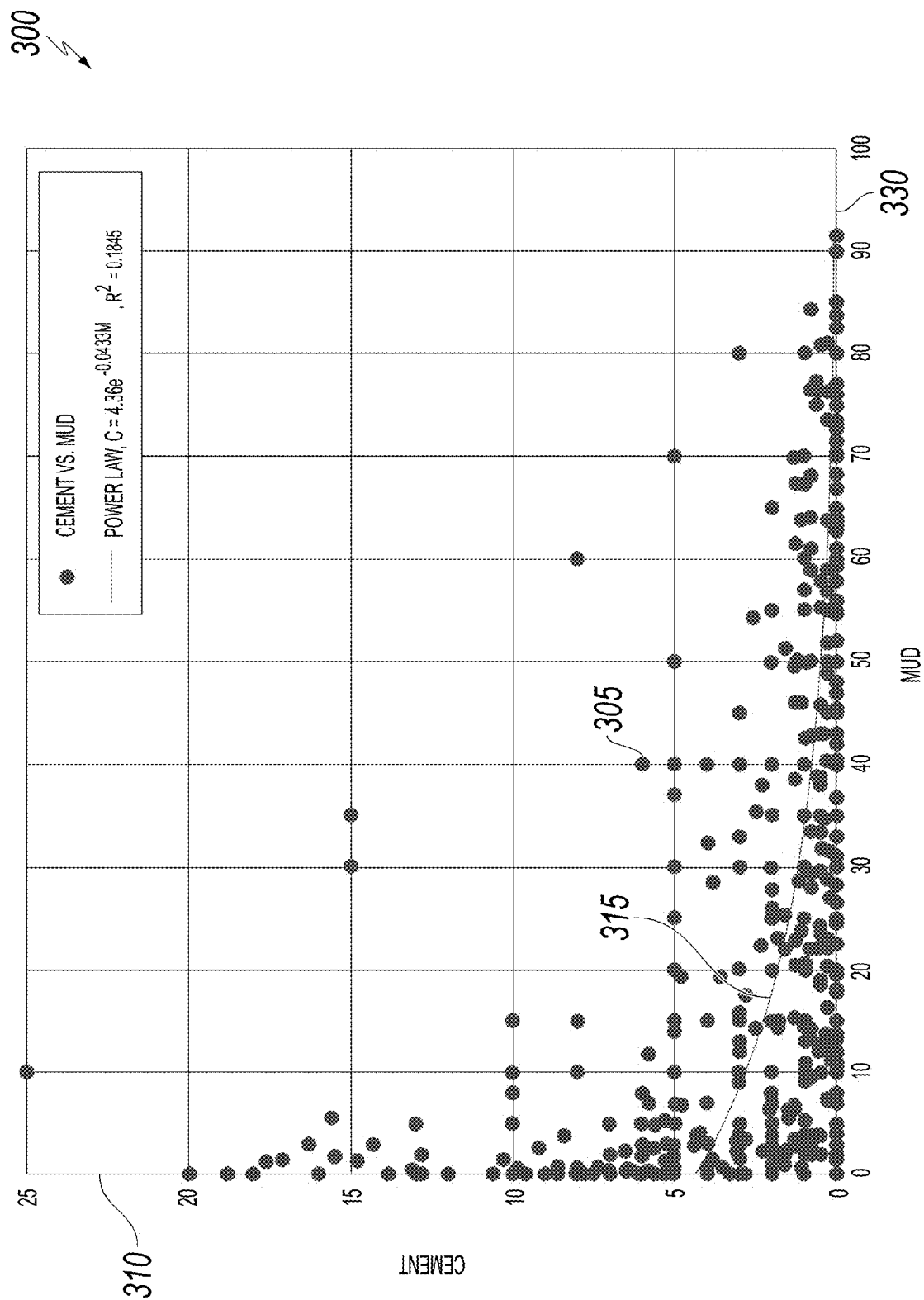
FIG. 3 is a data plot illustrating an example relationship between an amount of cement and mud content in carbonate rocks, according to an implementation.

FIG. 3 is a data plot 300 illustrating an example relationship 305 between an amount of cement and mud content in carbonate rocks (X-axis 330), according to an implementation of the present disclosure. The Y-axis 310 represents the amount of cement (in percentage), denoted as "Cement" (or C), while X-axis 330 represents the mud content (in percentage), denoted by "Mud" (or M). The example relationship 305 is obtained based on curve fitting of data 315 according to a power law. The data 315 includes the amount of cementation estimated from point counting of thin sections. The example relationship 305 represents the amount of total cement C as a function of the mud content M fit to a power law, as represented by Equation (3):

$$C = 4.36 * e^{-0.0433M} \quad (3),$$

where the coefficient of determination $R^2$ is calculated to be 0.1845, indicating that the fitting is satisfactory.

As shown in FIG. 3, the cleanest grainstones (with the least mud content) show the largest range of cementation up to 20%. As a carbonate rock gets muddier, the rock progresses from a mud-lean packstone to packstone, wackestone, and then to mudstone. At mudstone, the maximum amount of cement decreases likely because the permeabilities of carbonate rocks decrease with increasing mud content and the low depositional permeability inhibits the supply of sufficient fluid flow required for early cementation.

Figure 4:
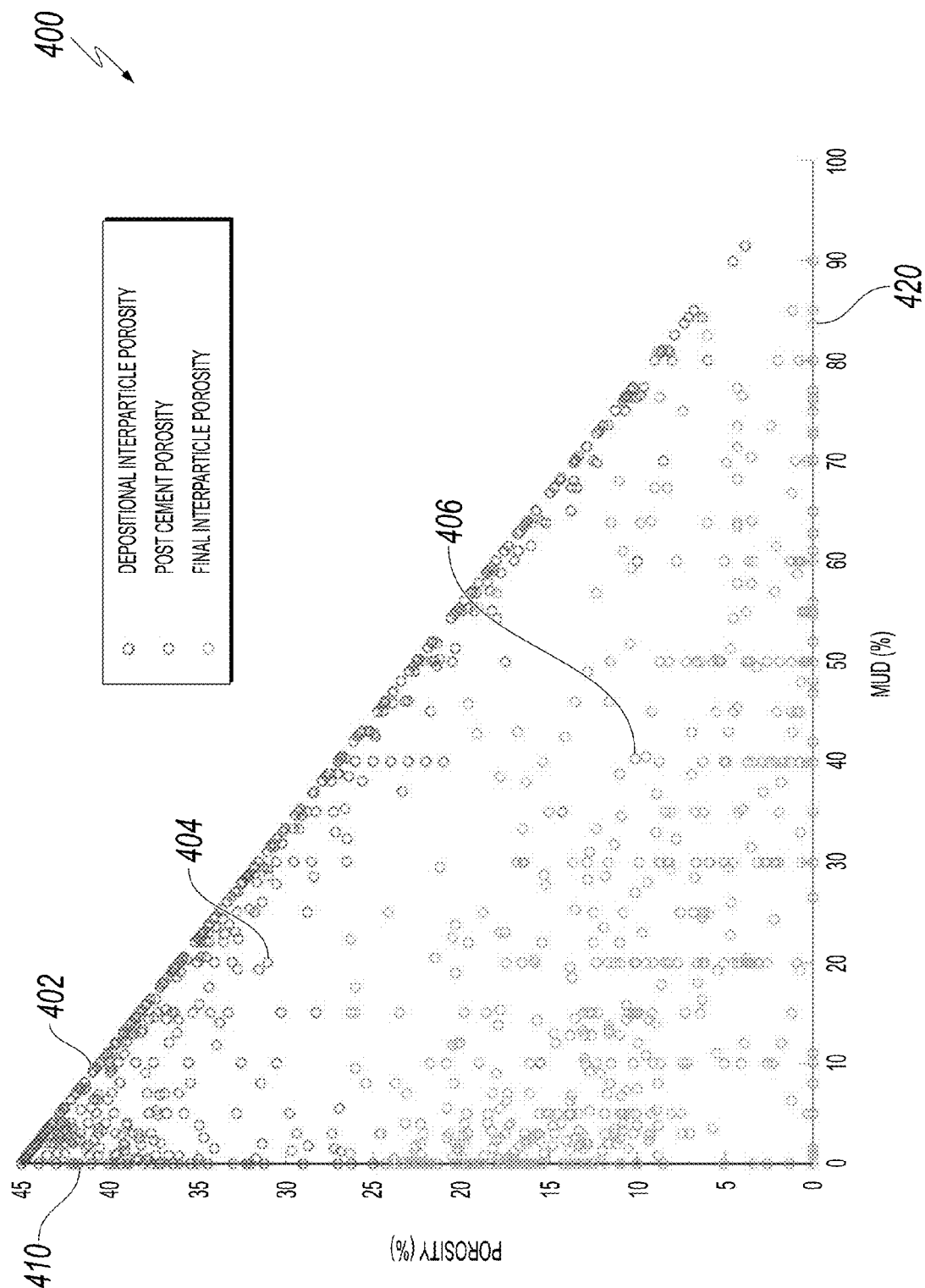
FIG. 4 is a data plot illustrating calculated depositional porosity, post cement porosity, and measured final interparticle porosity with respect to mud content in carbonate samples, according to an implementation of the present disclosure.

FIG. 4 is a data plot 400 illustrating depositional porosity 402, post-cement porosity 404, and final interparticle porosity 406 with respect to mud content in carbonate rocks, according to an implementation of the present disclosure. The Y-axis 410 represents the porosity (in percentage) of the carbonate rocks, while X-axis 420 represents the mud content of the carbonate rocks (in percentage), denoted by "Mud" (or M).

The depositional porosity 402 can be calculated, for example, based on the mud content according to Equation (1). In some implementations, given the assumption that cementation precedes compaction of carbonate rocks, the post-cementation porosity 404, $\phi_{post-cementation}$, can be calculated as represented by Equation (4):

$$\phi_{post-cementation} = (\phi_0 - C) \quad (4),$$

where the post-cementation porosity serves as the starting point for compaction.

The final interparticle porosities 406 of the carbonate rocks, denoted as $\phi_{final\text{-}interparticle}$, can be measured by point counting of thin sections of the carbonate rocks. The COPL can be calculated by subtracting final interparticle porosity 406 from the post-cementation porosity 404, as represented by Equation (5):

$$COPL = \phi_{post\text{-}cementation} - \phi_{final\text{-}interparticle} \quad (5).$$

Figure 5A:
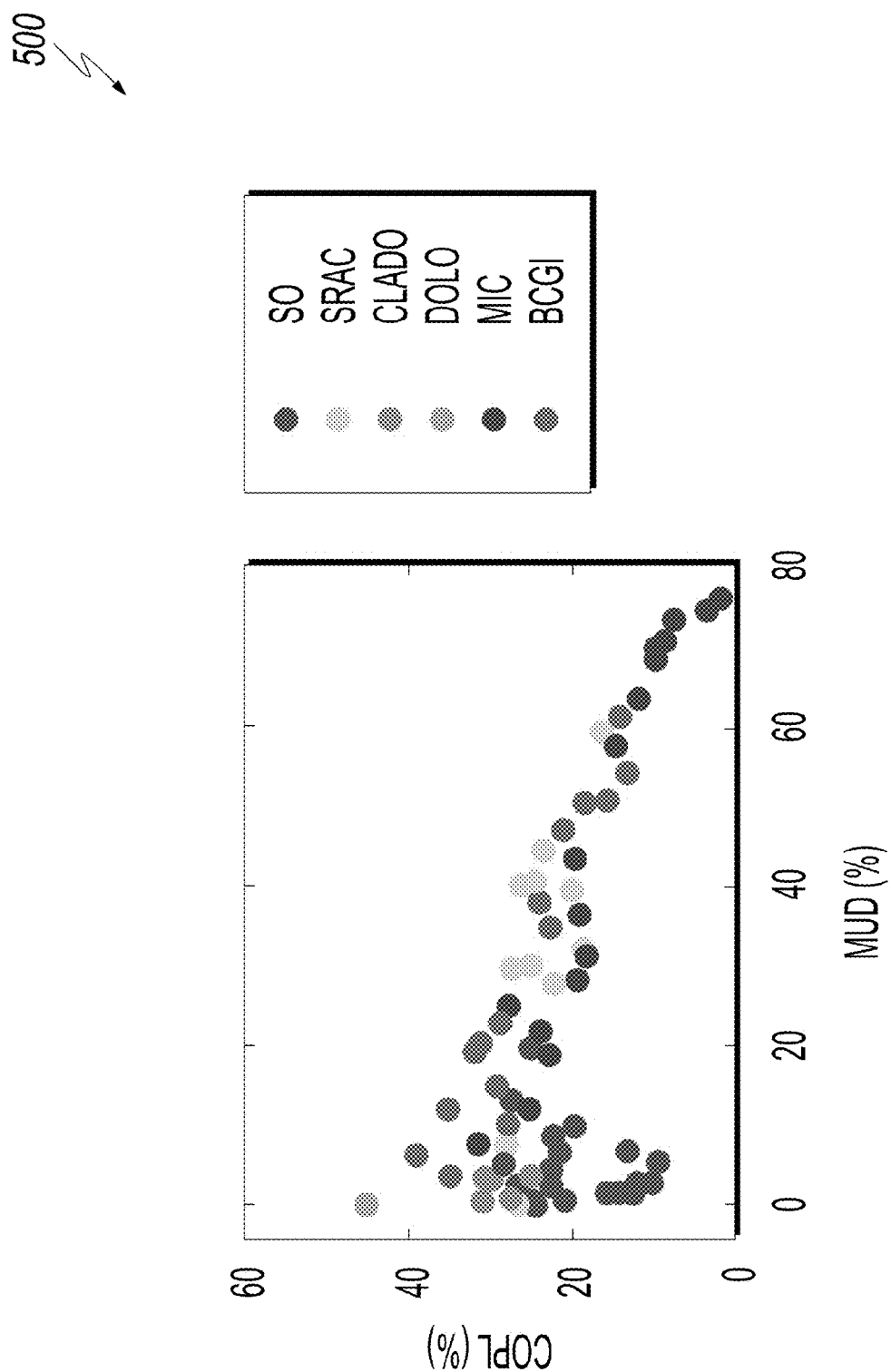
FIGS. 5A, 5B, and 5C are data plots illustrating calculated porosity losses by compaction (COPLs) with respect to mud content, cement, and depth, respectively, according to an implementation of the present disclosure.
Figure 5B:
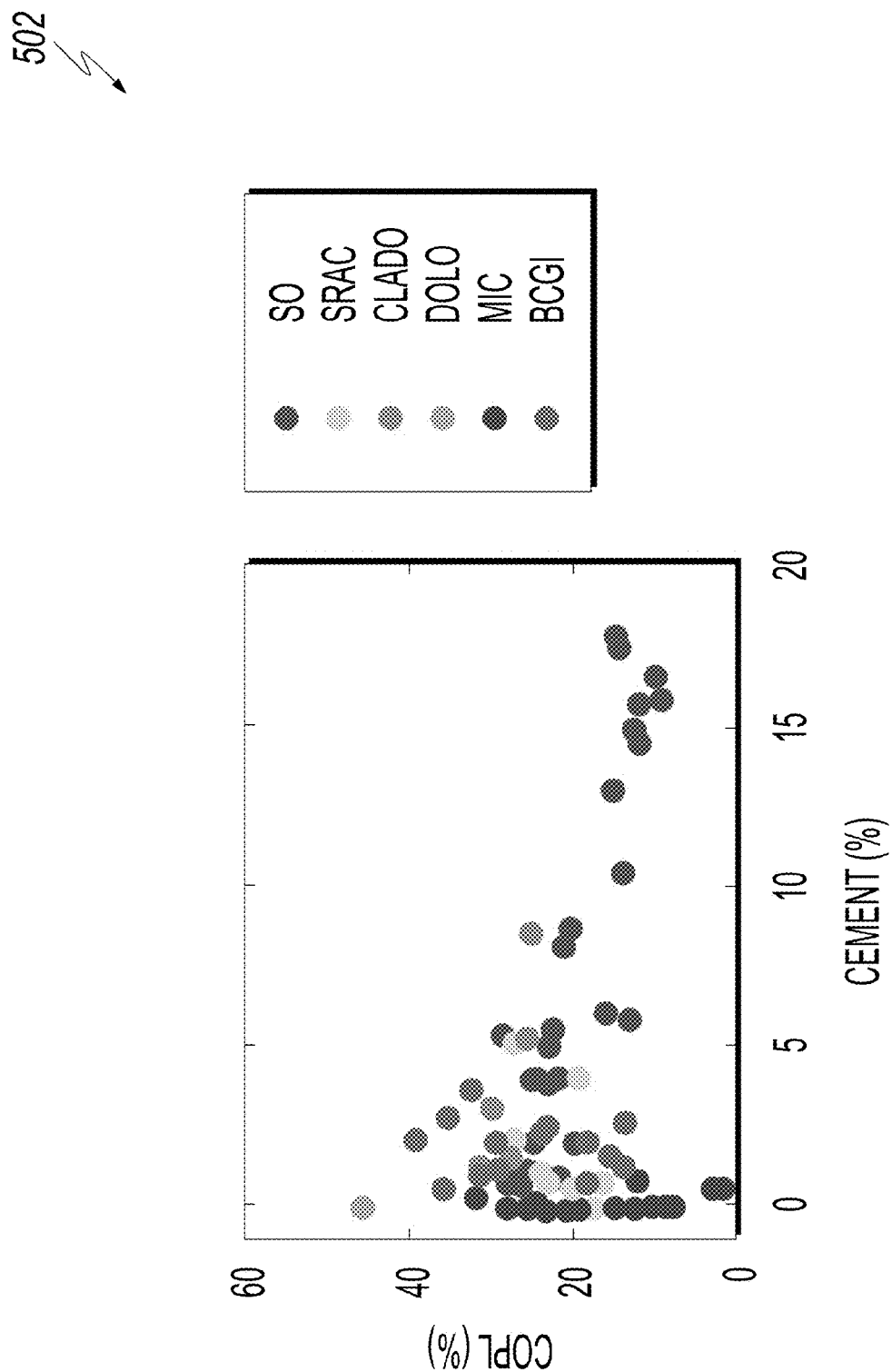
Figure 5C:
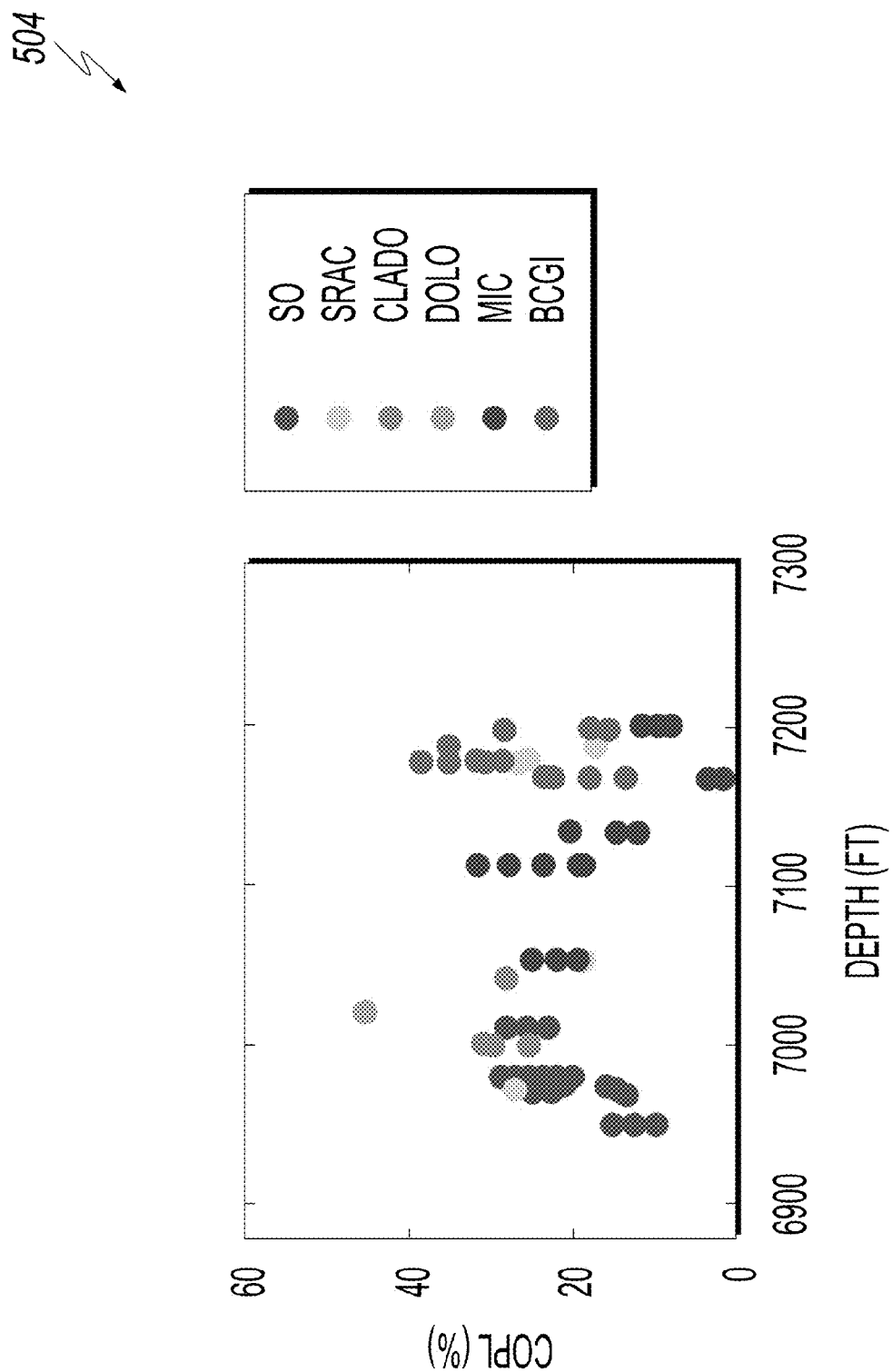

FIGS. 5A, 5B, and 5C are data plots 500, 502, and 504, respectively, illustrating COPLs with respect to mud content, cement, and depth, respectively, according to an implementation of the present disclosure. As shown in FIGS. 5A, 5B, and 5C, COPL is not a monotonic function of either mud content or cement. The value of COPL ranges from 10% to 40% in low mud content samples (for example, skeletal-oolitic (SO), Cladocoropsis (CLADO), and dolostones (DOLO)), and decreases with mud content, as mud content increases from 20% to 80% (for example, in bicalve-coated grain-intraclast (BCGI), stromatoporoid-red algea-coral (SRAC), and micritic (MIC) depositional facies).

Figure 5D:
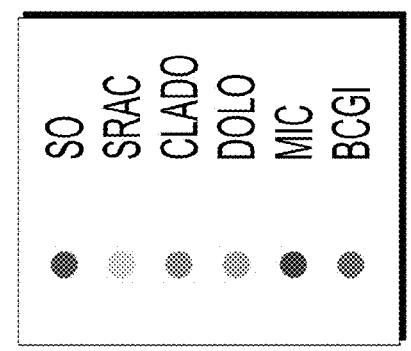
FIG. 5D is a data plot illustrating an amount of cement with respect to mud content, according to an implementation of the present disclosure.
Figure 5D:
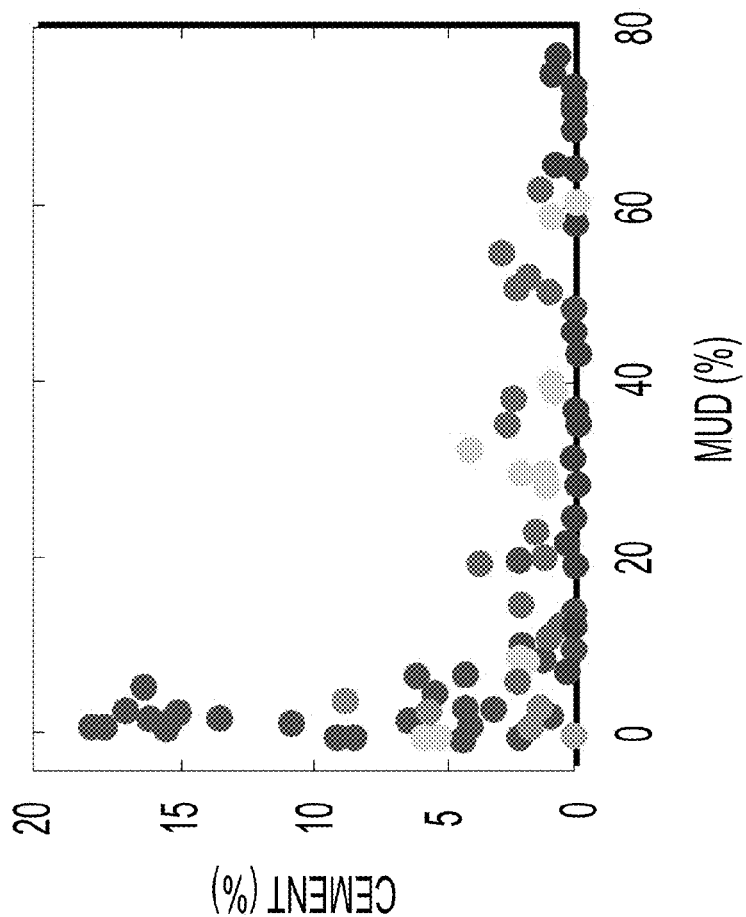

FIG. 5D is a data plot 506 illustrating an amount of cement with respect to mud content, according to an implementation of the present disclosure. Similar patterns to that of FIGS. 5A, 5B, and 5C are observed in the data plot 506 of COPL versus the amount of cement in FIG. 5D. The amount of cement is negatively related to the mud content. For MIC, SRAC, and BCGI depositional facies, the amount of cement is minor, and the value of COPL ranges from 0% to 40%. For samples with high cement content (for example, SO, CLADO, and DOLO), the value of COPL decreases with increasing cement. In some implementations, the MIC samples can be used to determine the quantitative relation between COPL and mud content since they have almost no cement. The SO samples can be good candidates to determine the relation between the COPL and cement content since they have relatively low mud content. The amount of cement and mud content are also related according to the previous discussion such as a similar relationship represented by Equation (3).

Figure 6:
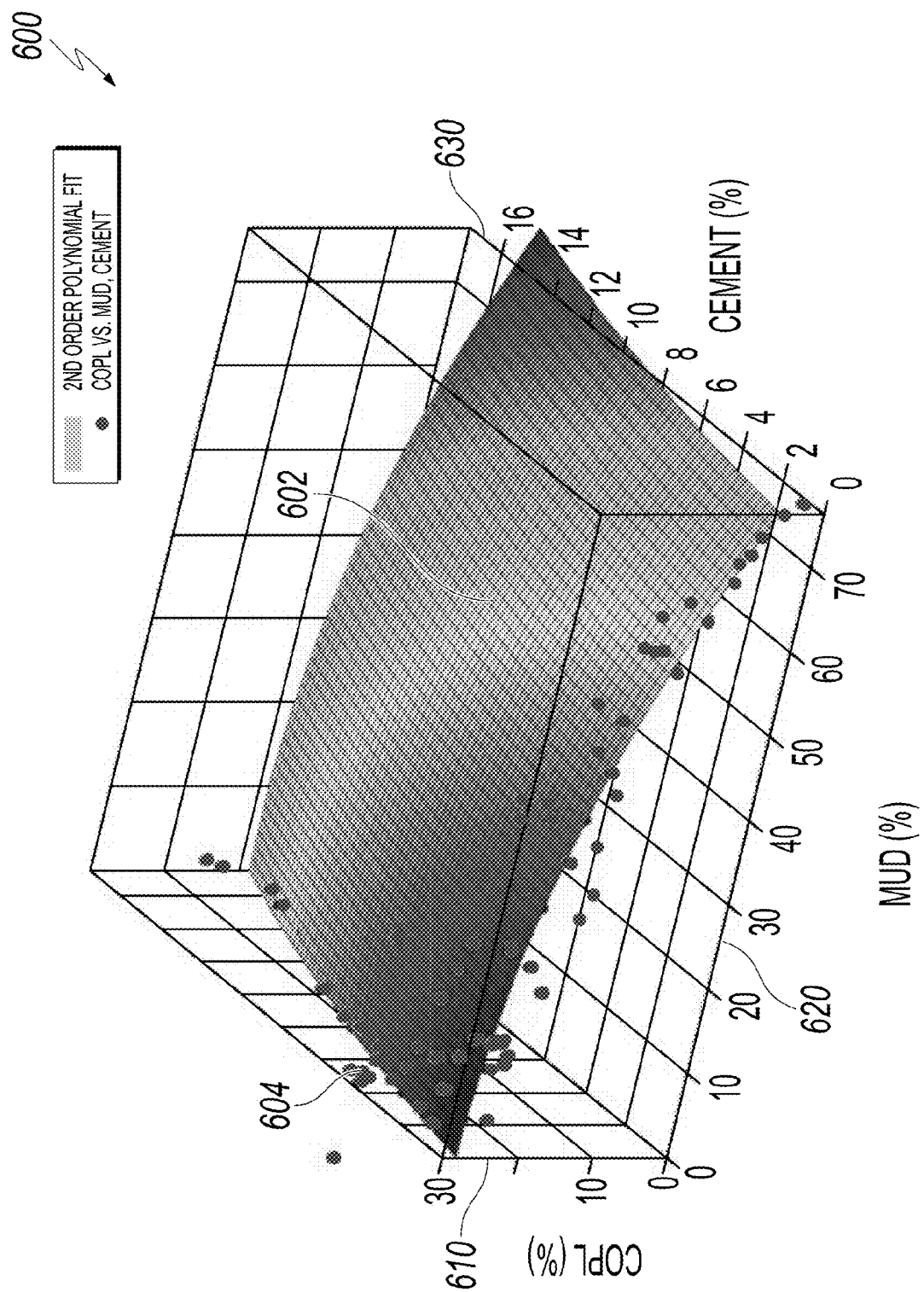
FIG. 6 is a data plot illustrating an example relationship between COPL with respect to mud content and an amount of cement in carbonate rocks, according to an implementation of the present disclosure.

FIG. 6 is a data plot 600 illustrating an example relationship 602 between COPL with respect to mud content and an amount of cement in carbonate rocks, according to an implementation of the present disclosure. FIG. 6 shows the COPL as a function of both mud content M and cement C based on data 604. The Z-axis 610 represents the COPL (in percentage) of the carbonate rocks, the X-axis 620 represents the mud content (in percentage) of the carbonate rocks, denoted by "Mud" (or M), and the Y-axis 630 represents the cement (in percentage) of the carbonate rocks, denoted by "Cement" (or C). In some implementations, the example relationship 602 is fit according to a 2nd order polynomial regression. The resulting function of COPL is given by Equation (6):

$$COPL = 23.56 - 4.303M - 2.085M^2 - 3.547C - 0.4291C^2 + 0.35MC \quad (6),$$

where the mud content M is normalized by a mean of 23.94 and a standard deviation of 23.91. The cement C is normalized by a mean of 3.084 and a standard deviation of 4.461. The coefficient of determination $R^2$ is calculated to be 0.929, indicating that the fitting is satisfactory.

Figure 7:
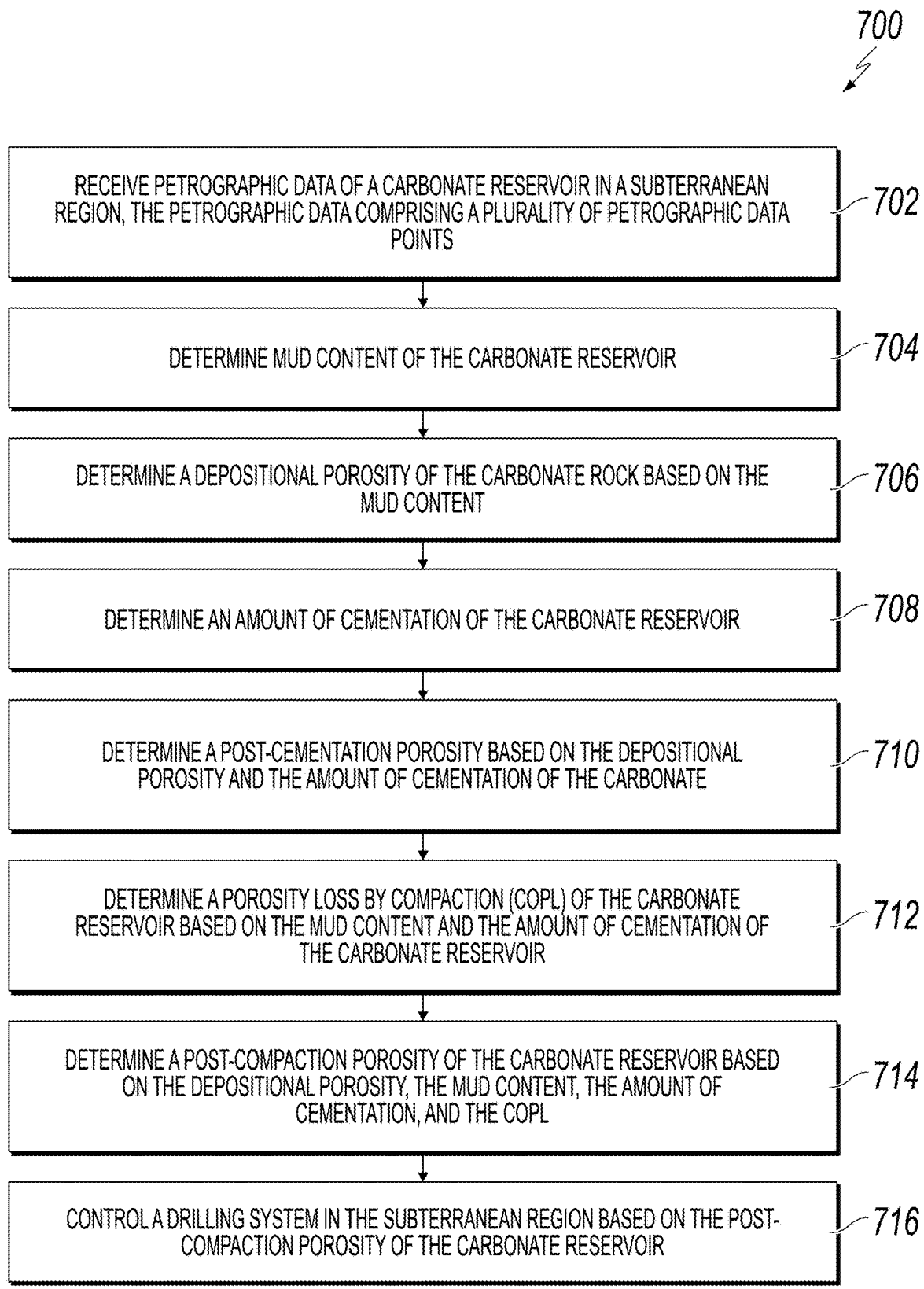
FIG. 7 is a flowchart of an example method for predicting carbonate porosity based on petrographic data, according to an implementation of the present disclosure.

FIG. 7 is a flowchart of an example method 700 for predicting carbonate porosity based on petrographic data, according to an implementation of the present disclosure. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. For example, various steps of method 700 can be performed by data processing apparatus (for example, one or more processor(s) of the computer system 900 in FIG. 9). In some implementations, various steps of method 700 can be run in parallel, in combination, in loops, or in any order.

At 702, petrographic data of a carbonate reservoir in a subterranean region is received, for example, by the data processing apparatus. The petrographic data can include information of a mud content, an amount of cement, and an interparticle porosity of the carbonate reservoir. In some implementations, a plurality of petrographic data can include information obtained from thin section samples of the carbonate reservoir. The information of the mud content, the amount of cement, and the interparticle porosity can be obtained, for example, by a user's viewing of the thin section samples of the carbonate reservoir under a microscope and point counting the fraction of each component (that is, mud, porosity, and cement), respectively.

The petrographic data point can be represented, for example, in an array, a vector, a matrix, or in a higher dimension. In some implementations, the petrographic data can be stored in a computer-readable medium (for example, memory) and the data processing apparatus can load, retrieve, or otherwise receive the petrographic data from the computer-readable medium. The subterranean region can include one or more carbonate reservoirs and other areas of interest under the earth's surface, for example, for purposes of hydrocarbon production. The carbonate reservoir can include one or more carbonate rocks or formations. From 702, method 700 proceeds to 704.

At 704, mud content of the carbonate reservoir is determined, for example, by the data processing apparatus based on the petrographic data. In some implementations, the mud content of the carbonate reservoir is received as an input parameter as part of the petrographic data. Accordingly, the data processing apparatus can directly determine the mud content of the carbonate reservoir based on the input parameter. In some implementations, the mud content of the carbonate reservoir is determined based on point counting of the petrographic thin sections of the carbonate reservoir. In some implementations, the mud content is determined based on empirical knowledge, past experiments, or another method. From 704, method 700 proceeds to 706.

At 706, a depositional porosity of the carbonate rock based on the mud content is computed, for example, by the data processing apparatus. In some implementations, the data processing apparatus determines the depositional porosity of the carbonate rock based on the mud content according to an empirical relation between the depositional porosity and the mud content. Equation (2) is an example empirical relation between the depositional porosity and the mud content. In some implementations, the empirical relation between the depositional porosity and the mud content is obtained based on data fitting of depositional porosity and mud content data of a second carbonate reservoir, for example, according to the techniques described with reference to FIG. 2. The second carbonate reservoir can be the same as or different from the carbonate reservoir for which the porosity is to be predicted. From 706, method 700 proceeds to 708.

At 708, an amount of cementation of the carbonate reservoir is determined, for example, by the data processing apparatus. In some implementations, the data processing apparatus determines the amount of cementation based on the mud content of the carbonate reservoir according to an empirical relation between the amount of cementation and the mud content. Equation (3) is an example empirical relation between the depositional porosity and the mud content. In some implementations, the empirical relation between the depositional porosity and the mud content is obtained based on data fitting of cementation and mud content data of a third carbonate reservoir, for example, according to the techniques described with reference to FIG. 3. The third carbonate reservoir can be the same as or different from the carbonate reservoir for which the porosity is to be predicted.

In some implementations, the data processing apparatus determines the amount of cementation based on the petrographic data. For example, the petrographic data can be received as an input parameter as part of the petrographic data. Accordingly, the data processing apparatus can directly determine the amount of cementation of the carbonate reservoir based on the input parameter. In some implementations, the amount of cementation of the carbonate reservoir is determined based on point counting of the petrographic thin sections of the carbonate reservoir. For example, the point counting is performed manually by visualizing thin section samples under a microscope and counting the fraction of each cement component. In some implementations, the mud content is determined based on empirical knowledge, past experiments, or another method. From 708, method 700 proceeds to 710.

At 710, a post-cementation porosity is computed based on the depositional porosity and the amount of cementation of the carbonate, for example, by the data processing apparatus. In some implementations, the data processing apparatus determines the post-cementation porosity according to Equation (4). That is, the post-cementation porosity is computed as the excess of the depositional porosity over the amount of cementation of the carbonate. From 710, method 700 proceeds to 712.

At 712, the COPL of the carbonate reservoir is determined based on the mud content and the amount of cementation of the carbonate reservoir, for example, by the data processing apparatus. In some implementations, the data processing apparatus determines the COPL according to an empirical relation between the COPL and the amount of cementation and the mud content. Equation (6) is an example of such an empirical relation. In some implementations, the empirical relation between the depositional porosity and the mud content is obtained based on data fitting of COPL, cementation, and mud content data of a fourth carbonate reservoir, for example, according to the techniques described with reference to FIG. 6. The fourth carbonate reservoir can be the same as or different from the carbonate reservoir for which the porosity is to be predicted. From 712, method 700 proceeds to 714.

At 714, a post-compaction porosity of the carbonate reservoir is computed based on the depositional porosity, the mud content, the amount of cementation, and the porosity loss by compaction, for example, by the data processing apparatus. In some implementations, the post-compaction porosity can be output as the final interparticle porosities of the carbonate reservoir. In some implementations, the data processing apparatus determines the post-compaction porosity according to Equation (5) as an excess of the post-cementation porosity over the porosity loss by compaction. As previously described, the post-cementation porosity can be determined based on the depositional porosity and the amount of cementation, for example, according to Equation (4). Accordingly, in some implementations, the post-compaction porosity can be directly calculated as an excess of the depositional porosity over a sum of the mud content, the amount of cementation, and the porosity loss by compaction. From 714, method 700 proceeds to 716.

At 716, a drilling system in the subterranean region is controlled based on the post-compaction porosity. In some implementations, the post-compaction porosity can be used to determine a drilling location of one or more wells by the drilling system for hydrocarbon production in the subterranean region of the carbonate reservoir. For example, the carbonate reservoir can be determined based on the post-compaction porosity. In general, reservoirs with large values of porosity are preferred to be drilled, while reservoirs with small values of porosity are not recommended targets for drilling. For example, if the post-compaction porosity of the carbonate reservoir exceeds a predetermined threshold, the carbonate reservoir can be determined as a potential target for drilling. In some implementations, if the post-compaction porosity of one or more areas of the carbonate reservoir exceeds a predetermined threshold, one or more areas of the carbonate reservoir can be determined as the preferred locations for drilling.

In some implementations, the predicted porosity of the carbonate reservoir can be output by the data processing apparatus. For example, the predicted porosity can be included as part of a data package uploaded to another data processing apparatus that is used to design, plan, manage, or otherwise control the drilling system. For example, this or another data processing apparatus can use the predicted porosity to control a hydrocarbon-recovery-type drill (such as, direction or speed) and other related equipment (for example, a monitoring or controlling computing system). After 716, method 700 stops.

Figure 8:
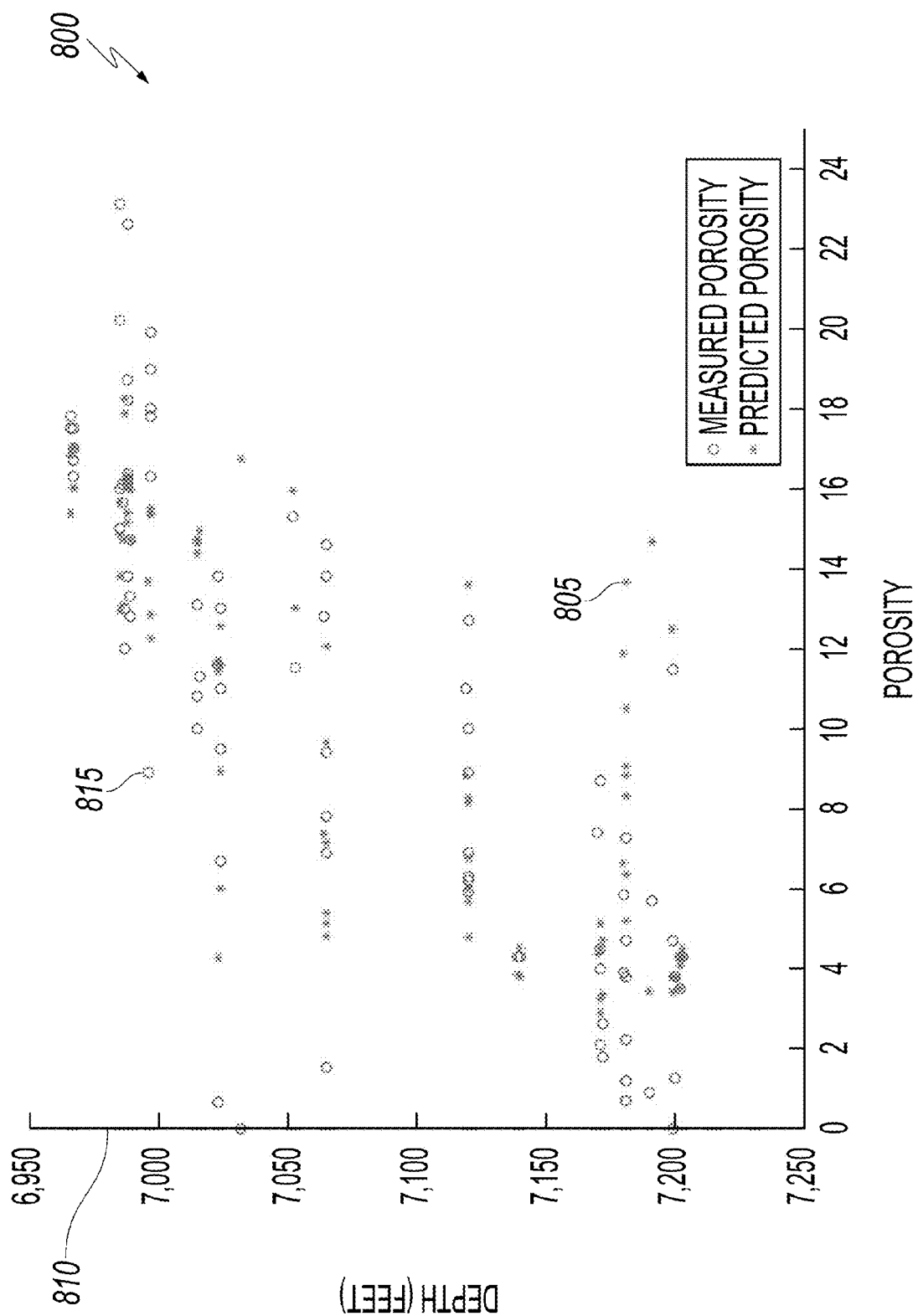
FIG. 8 is a data plot illustrating an example simulation result of a described method for calculating porosity of carbonate rocks based on petrographic data, according to an implementation of the present disclosure.

FIG. 8 is a data plot 800 illustrating an example simulation result of a described method for calculating porosity of carbonate rocks based on petrographic data, according to an implementation of the present disclosure. The simulation is performed generally according to the example method 700 for calculating porosity of carbonate rocks based on petrographic data. The simulation leverages the established empirical relations between depositional porosity, cement, and compaction to predict reservoir porosity as previously described. Specifically, mud content is an input parameter. The depositional porosity ($\phi_0$) is calculated from mud content using Equation (2). The amount of cementation is measured from point counting of thin section samples of the carbonate rocks. The porosity loss by compaction is calculated using Equation (6). The final interparticle porosity is calculated according to Equation (5). The calculated or predicted final interparticle porosities (in percentage) are plotted as stars 805 against the depths of the thin section samples that are represented by the Y-axis 810 (in feet). The measured interparticle porosities are plotted as circles 815 against the depths of the thin section samples.

As shown in FIG. 8, the calculated final interparticle porosities overlap substantially with the measured interparticle porosities. Accordingly, the simulation result demonstrates that the described method for calculating porosity of carbonate rocks based on petrographic data provides a good prediction of the interparticle porosity of carbonate rocks. The simulation result also confirms the accuracy of the established empirical relations between depositional porosity, cement, and compaction.

The EXEMPLAR and TOUCHSTONE software use a compaction equation, Equation (7), for predicting porosity of sandstones:

$$IGV = IGV_f + (\phi_0 + m_0 - IGV_f)e^{-\beta\sigma_{es}} \quad (7)$$

where intergranular volume (IGV) is the sum of pore space, cements, and matrix material (volume fraction), $IGV_f$ is the stable packing configuration (volume fraction), $\phi_0$ is the depositional porosity (volume fraction), $m_0$ is the initial proportion of matrix material (volume fraction), $\beta$ is the exponential rate of IGV decline with effect stress (M Pascal$^{-1}$), and $\sigma_{es}$ is the maximum effective stress (MPa). In some implementations, Equation (7) contains three terms that reflect the texture and composition of sandstones: 1) depositional porosity ($\phi_0$); 2) stable packing configuration ($IGV_f$); and 3) exponential rate of compaction with effective stress ($\beta$). Values for the $\phi_0$ term can be taken from measurements of near surface sandstone porosities. The $IGV_f$ and $\beta$ terms can be obtained through empirical calibration. For example, a value of $\phi_0=47.5\%$ for moderately sorted sandstones, $IGF_f=28.0\%$, and $\beta=0.06$ MPa$^{-1}$ have been used to calculate IGV.

By contrast, simulation results of the proposed techniques for carbonate rocks show that the depositional porosity is not a single value, but a function of mud content in the sediments. In some implementations, stable packing porosity ($IGV_f$) may also need to be modified for high mud content samples. In some implementations, a first order approximation of $IGV_f$ can be used for carbonate rocks with low mud content by using the same value as those for sandstones. For carbonate rocks with high mud content, the $IGV_f$ can be assumed to be zero since at high mud content, the interparticle porosity is filled by mud in a stable packing configuration. Unlike in TOUCHSTONE, where the COPL is a single function of effective stress (related to depth), simulation results of the proposed techniques for carbonate rocks demonstrate that the compaction of carbonate is also affected by mud and cement contents. That is, the more mud and cement in the carbonate rock, the less porosity is lost during compaction. Thus the compaction factor $\alpha$ can represented by Equation (8), which is a function of mud content and cement, in addition to effective stress:

$$IGV = IGV_{f(m_0)} + [\phi_{0(m_0)} + m_0 - IGV_{f(m_0)} - \text{Cement}]\alpha(\sigma_{es}, m_0, \text{Cement}) \quad (8)$$

In some implementations, assuming an exponential relationship of porosity as a function of depth, a characteristic length (related to $\alpha$) is defined in a compaction curve representing the difficulty for sediments to compact. The characteristic length is positively related to the amount of cement, indicating that early cement may act to create a rigid framework preserving interparticle porosity and protecting the rock from later compaction. As shown in Equation (8), the cement is in a function of a, unlike the TOUCHSTONE method as shown in Equation (7). Equation (8) can be used to compute COPL, for example at 712 of the example method 700.

Figure 9:
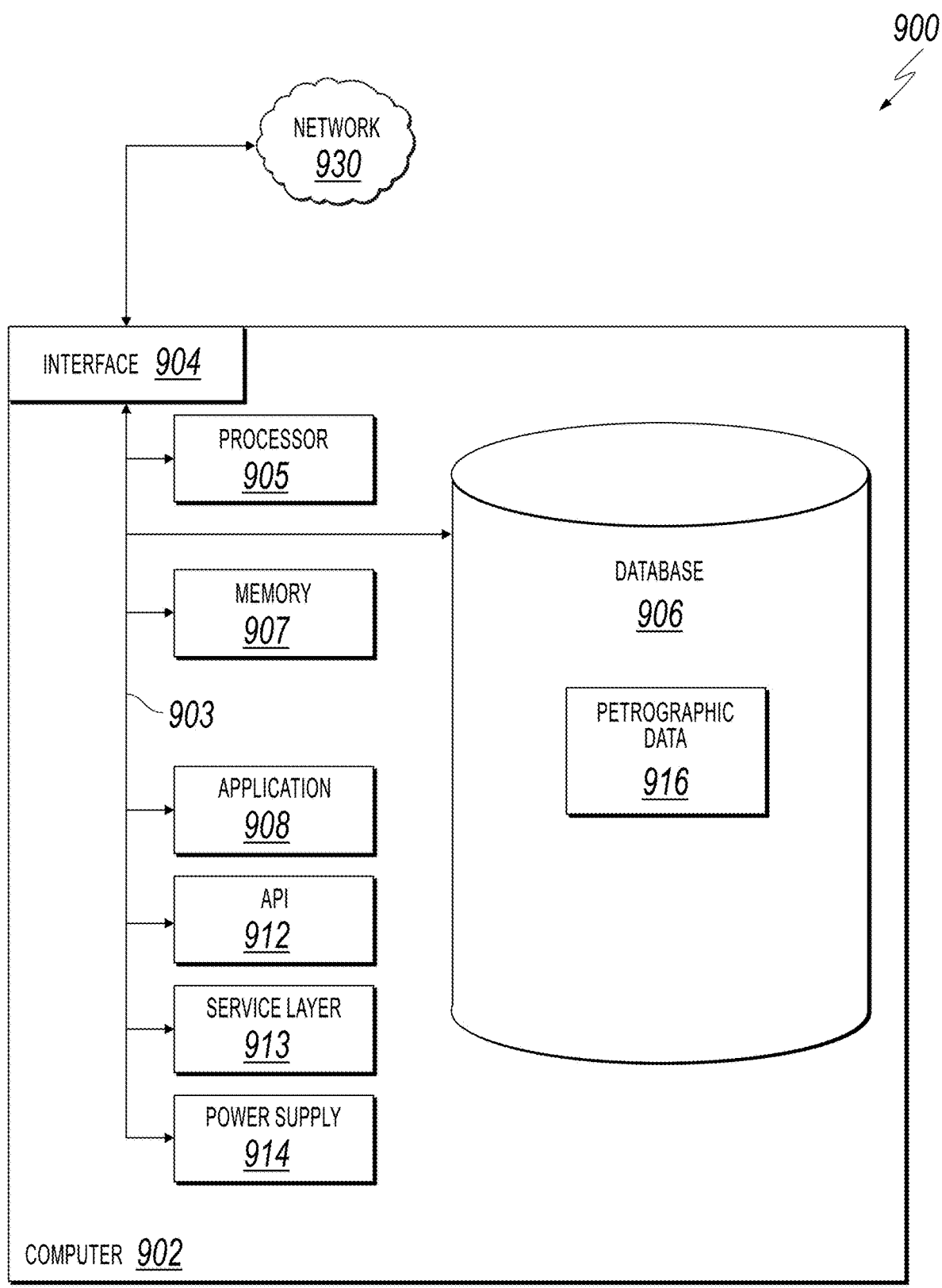
FIG. 9 is a block diagram illustrating an example of a computer-implemented system used to provide computational functionalities associated with described algorithms, methods, functions, processes, flows, and procedures, according to an implementation of the present disclosure.

FIG. 9 is a block diagram illustrating an example of a computer-implemented system used to provide computational functionalities associated with described algorithms, methods, functions, processes, flows, and procedures, according to an implementation of the present disclosure. In the illustrated implementation, System 900 includes a Computer 902 and a Network 930.

The illustrated Computer 902 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 902 can include an input device, such as a keypad, keyboard, touch screen, another input device, or a combination of input devices that can accept user information, and an output device that conveys information associated with the operation of the Computer 902, including digital data, visual, audio, another type of information, or a combination of types of information, on a graphical-type user interface (UI) (or GUI) or other UI. For example, in some implementations, the illustrated data plots (such as, FIGS. 2-4, 5A-5D, 6, and 8) or other GUIs (not illustrated) that are associated with the illustrated data plots can be interactive in nature and permit user actions to be performed (such as, triggering messages or requests for data to change, modify, or enhance the data plots or to perform actions based on the displayed data).

The Computer 902 can serve in a role in a distributed computing system as a client, network component, a server, a database or another persistency, a similar role, or a combination of roles for performing the methodology described in the present disclosure. The illustrated Computer 902 is communicably coupled with a Network 930. In some implementations, one or more components of the Computer 902 can be configured to operate within an environment, including cloud-computing-based, local, global, a similar environment, or a combination of environments.

At a high level, the Computer 902 is an electronic computing device operable to receive, transmit, process, store, or manage data and information associated with the described subject matter. According to some implementations, the Computer 902 can also include or be communicably coupled with a server, including an application server, e-mail server, web server, caching server, streaming data server, a similar server, or a combination of servers.

The Computer 902 can receive requests over Network 930 (for example, from a client software application executing on another Computer 902) and respond to the received requests by processing the received requests using a software application or a combination of software applications. In addition, requests can also be sent to the Computer 902 from internal users (for example, from a command console or by another internal access method), external or third-parties, or other entities, individuals, systems, or computers.

Each of the components of the Computer 902 can communicate using a System Bus 903. In some implementations, any or all of the components of the Computer 902, including hardware, software, or a combination of hardware and software, can interface over the System Bus 903 using an application programming interface (API) 912, a Service Layer 913, or a combination of the API 912 and Service Layer 913. The API 912 can include specifications for routines, data structures, and object classes. The API 912 can be either computer-language independent or dependent and refer to a complete interface, a single function, or even a set of APIs. The Service Layer 913 provides software services to the Computer 902 or other components (whether illustrated or not) that are communicably coupled to the Computer 902. The functionality of the Computer 902 can be accessible for all service consumers using the Service Layer 913. Software services, such as those provided by the Service Layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 902, alternative implementations can illustrate the API 912 or the Service Layer 913 as stand-alone components in relation to other components of the Computer 902 or other components (whether illustrated or not) that are communicably coupled to the Computer 902. Moreover, any or all parts of the API 912 or the Service Layer 913 can be implemented as a child or a sub-module of another software module, enterprise application, or hardware module without departing from the scope of the present disclosure.

The Computer 902 includes an Interface 904. Although illustrated as a single Interface 904, two or more Interfaces 904 can be used according to particular needs, desires, or particular implementations of the Computer 902. The Interface 904 is used by the Computer 902 for communicating with another computing system (whether illustrated or not) that is communicatively linked to the Network 930 in a distributed environment. Generally, the Interface 904 is operable to communicate with the Network 930 and includes logic encoded in software, hardware, or a combination of software and hardware. More specifically, the Interface 904 can include software supporting one or more communication protocols associated with communications such that the Network 930 or hardware of Interface 904 is operable to communicate physical signals within and outside of the illustrated Computer 902.

The Computer 902 includes a Processor 905. Although illustrated as a single Processor 905, two or more Processors 905 can be used according to particular needs, desires, or particular implementations of the Computer 902. Generally, the Processor 905 executes instructions and manipulates data to perform the operations of the Computer 902 and any algorithms, methods, functions, processes, flows, and procedures as described in the present disclosure.

The Computer 902 also includes a Database 906 that can hold data for the Computer 902, another component communicatively linked to the Network 930 (whether illustrated or not), or a combination of the Computer 902 and another component. For example, Database 906 can be an in-memory, conventional, or another type of database storing data consistent with the present disclosure. In some implementations, Database 906 can be a combination of two or more different database types (for example, a hybrid in-memory and conventional database) according to particular needs, desires, or particular implementations of the Computer 902 and the described functionality. Although illustrated as a single Database 906, two or more databases of similar or differing types can be used according to particular needs, desires, or particular implementations of the Computer 902 and the described functionality. While Database 906 is illustrated as an integral component of the Computer 902, in alternative implementations, Database 906 can be external to the Computer 902. As illustrated, the database 906 holds previously described petrographic data 916.

The Computer 902 also includes a Memory 907 that can hold data for the Computer 902, another component or components communicatively linked to the Network 930 (whether illustrated or not), or a combination of the Computer 902 and another component. Memory 907 can store any data consistent with the present disclosure. In some implementations, Memory 907 can be a combination of two or more different types of memory (for example, a combination of semiconductor and magnetic storage) according to particular needs, desires, or particular implementations of the Computer 902 and the described functionality. Although illustrated as a single Memory 907, two or more Memories 907 or similar or differing types can be used according to particular needs, desires, or particular implementations of the Computer 902 and the described functionality. While Memory 907 is illustrated as an integral component of the Computer 902, in alternative implementations, Memory 907 can be external to the Computer 902.

The Application 908 is an algorithmic software engine providing functionality according to particular needs, desires, or particular implementations of the Computer 902, particularly with respect to functionality described in the present disclosure. For example, Application 908 can serve as one or more components, modules, or applications. Further, although illustrated as a single Application 908, the Application 908 can be implemented as multiple Applications 908 on the Computer 902. In addition, although illustrated as integral to the Computer 902, in alternative implementations, the Application 908 can be external to the Computer 902.

The Computer 902 can also include a Power Supply 914. The Power Supply 914 can include a rechargeable or non-rechargeable battery that can be configured to be either user- or non-user-replaceable. In some implementations, the Power Supply 914 can include power-conversion or management circuits (including recharging, standby, or another power management functionality). In some implementations, the Power Supply 914 can include a power plug to allow the Computer 902 to be plugged into a wall socket or another power source to, for example, power the Computer 902 or recharge a rechargeable battery.

There can be any number of Computers 902 associated with, or external to, a computer system containing Computer 902, each Computer 902 communicating over Network 930. Further, the term "client," "user," or other appropriate terminology can be used interchangeably, as appropriate, without departing from the scope of the present disclosure. Moreover, the present disclosure contemplates that many users can use one Computer 902, or that one user can use multiple computers 902.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementation, the output of the described methodology can be used to dynamically influence, direct, control, influence, or manage tangible, real-world equipment related to hydrocarbon production, analysis, and recovery or for other purposes consistent with this disclosure. For example, real-time data received from an ongoing drilling operation can be incorporated into a prediction of porosity of carbonate rocks based on petrographic data performed using the described methodology. In some implementations, the output of the described methodology can be used for various purposes, including improving quality of seismic/structural images or to enhance other analytical/predictive processes. In some implementations, a generated result(s) of the described methodology can be used to modify a wellbore trajectory, increase or reduce a drill speed, stop a drill, open/close valves, activate/deactivate an alarm (such as visual, auditory, or voice alarms), affect refinery or pumping operations (for example, stop, restart, accelerate, or reduce). Other examples can include alerting geo-steering and directional drilling staff based on subsurface porosity determinations (such as with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method for predicting porosity of a carbonate reservoir includes the following operations. A data processing apparatus receives petrographic data of a carbonate reservoir in a subterranean region. The data processing apparatus determines mud content of the carbonate reservoir based on the petrographic data. The data processing apparatus determines a depositional porosity of the carbonate reservoir based on the mud content. The data processing apparatus determines an amount of cementation of the carbonate reservoir. The data processing apparatus determines a porosity loss by compaction of the carbonate reservoir based on the mud content and the amount of cementation of the carbonate reservoir. The data processing apparatus determines a post-compaction porosity of the carbonate reservoir based on the depositional porosity, the mud content, the amount of cementation, and the porosity loss by compaction.

The foregoing and other described implementations can each, optionally, include one or more of the following features:

As a first feature, combinable with any of the following features, determining a depositional porosity of the carbonate reservoir based on the mud content includes determining the depositional porosity of the carbonate reservoir based on the mud content according to an empirical relation between the depositional porosity and the mud content.

As a second feature, combinable with any of the previous or following features, the empirical relation between the depositional porosity and the mud content is obtained based on data fitting of depositional porosity and mud content data of a second carbonate reservoir.

As a third feature, combinable with any of the previous or following features, the method further includes determining, by the data processing apparatus, a post-cementation porosity based on the depositional porosity and the amount of cementation of the carbonate reservoir.

As a fourth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of post-cementation porosity over the porosity loss by compaction.

As a fifth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of the depositional porosity over a sum of the mud content, the amount of cementation, and the porosity loss by compaction.

As sixth feature, combinable with any of the previous or following features, the method further includes controlling a drilling system in the subterranean region based on the post-compaction porosity of the carbonate reservoir.

In a second implementation, a non-transitory, computer-readable medium stores one or more instructions executable by a computer system to perform the following operations. The computer system receives petrographic data of a carbonate reservoir in a subterranean region. The computer system determines mud content of the carbonate reservoir based on the petrographic data. The computer system determines a depositional porosity of the carbonate reservoir based on the mud content. The computer system determines an amount of cementation of the carbonate reservoir. The computer system determines a porosity loss by compaction of the carbonate reservoir based on the mud content and the amount of cementation of the carbonate reservoir. The computer system determines a post-compaction porosity of the carbonate reservoir based on the depositional porosity, the mud content, the amount of cementation, and the porosity loss by compaction.

The foregoing and other described implementations can each, optionally, include one or more of the following features:

As a first feature, combinable with any of the following features, determining a depositional porosity of the carbonate reservoir based on the mud content includes determining the depositional porosity of the carbonate reservoir based on the mud content according to an empirical relation between the depositional porosity and the mud content.

As a second feature, combinable with any of the previous or following features, the empirical relation between the depositional porosity and the mud content is obtained based on data fitting of depositional porosity and mud content data of a second carbonate reservoir.

As a third feature, combinable with any of the previous or following features, the operations further include determining, by the computer system, a post-cementation porosity based on the depositional porosity and the amount of cementation of the carbonate reservoir.

As a fourth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of post-cementation porosity over the porosity loss by compaction.

As a fifth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of the depositional porosity over a sum of the mud content, the amount of cementation, and the porosity loss by compaction.

As a sixth feature, combinable with any of the previous or following features, the operations further include controlling a drilling system in the subterranean region based on the post-compaction porosity of the carbonate reservoir.

In a third implementation, a computer-implemented system includes: a computer memory; and a hardware processor interoperably coupled with the computer memory and configured to perform the following operations. Petrographic data of a carbonate reservoir in a subterranean region is received. Mud content of the carbonate reservoir is determined based on the petrographic data. A depositional porosity of the carbonate reservoir is computed based on the mud content. An amount of cementation of the carbonate reservoir is determined. A porosity loss by compaction of the carbonate reservoir is determined based on the mud content and the amount of cementation of the carbonate reservoir; and determining a post-compaction porosity of the carbonate reservoir based on the depositional porosity, the mud content, the amount of cementation, and the porosity loss by compaction.

The foregoing and other described implementations can each, optionally, include one or more of the following features:

As a first feature, combinable with any of the following features, determining a depositional porosity of the carbonate reservoir based on the mud content includes determining the depositional porosity of the carbonate reservoir based on the mud content according to an empirical relation between the depositional porosity and the mud content.

As a second feature, combinable with any of the previous or following features, the empirical relation between the depositional porosity and the mud content is obtained based on data fitting of depositional porosity and mud content data of a second carbonate reservoir.

As a third feature, combinable with any of the previous or following features, wherein the operations further include determining a post-cementation porosity based on the depositional porosity and the amount of cementation of the carbonate reservoir.

As a fourth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of post-cementation porosity over the porosity loss by compaction.

As a fifth feature, combinable with any of the previous or following features, determining a post-compaction porosity of the carbonate reservoir based on the depositional porosity, the mud content, the amount of cementation, and the porosity loss by compaction includes determining the post-compaction porosity of the carbonate reservoir as an excess of the depositional porosity over a sum of the mud content, the amount of cementation, and the porosity loss by compaction.

As a sixth feature, combinable with any of the previous or following features, the operations further include controlling a drilling system in the subterranean region based on the post-compaction porosity of the carbonate reservoir.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium; and a computer system. The computer-readable medium stores computer-readable instructions to perform the computer-implemented method. The computer system includes a computer memory interoperably coupled with a hardware processor configured to perform the computer-implemented method or the instructions stored on the non-transitory, computer-readable medium.

What is claimed is:

1. A computer-implemented method for predicting porosity of a carbonate reservoir, comprising:
    receiving, by data processing apparatus, petrographic data of a carbonate reservoir in a subterranean region;
    determining, by the data processing apparatus, mud content percentage of the carbonate reservoir based on the petrographic data;
    determining, by the data processing apparatus and using a model modeling effects of compaction and cementation on depositional porosities in carbonate rocks, a depositional porosity of the carbonate reservoir based on the mud content percentage;
    determining, by the data processing apparatus, an interparticle porosity based on the mud content percentage;
    determining, by the data processing apparatus, an amount of cementation of the carbonate reservoir;
    determining, by the data processing apparatus, a post-cementation porosity of the carbonate reservoir based on a difference between the interparticle porosity and the amount of cementation; and
    determining, by the data processing apparatus and using the model and including a calculated porosity loss by compaction, a porosity loss by compaction of the carbonate reservoir based on a difference between the post-cementation porosity and a final interparticle porosity, including determining the final interparticle porosity measured by point counting of thin sections of the carbonate rocks, and wherein determining the porosity loss by compaction is based on the mud content percentage.

2. The computer-implemented method of claim 1, wherein determining a depositional porosity of the carbonate reservoir based on the mud content percentage comprises determining the depositional porosity of the carbonate reservoir based on the mud content percentage according to an empirical relation between the depositional porosity and the mud content percentage.

3. The computer-implemented method of claim 2, wherein the empirical relation between the depositional porosity and the mud content percentage is obtained based on data fitting of depositional porosity and mud content data of a second carbonate reservoir.

4. The computer-implemented method of claim 1, wherein determining a post cementation porosity of the carbonate reservoir based on the depositional porosity, the mud content percentage, the amount of cementation, and the porosity loss by compaction comprises determining the post cementation porosity of the carbonate reservoir as an excess of post-cementation porosity over the porosity loss by compaction.

5. The computer-implemented method of claim 1, wherein determining a post cementation porosity of the carbonate reservoir based on the depositional porosity, the mud content percentage, the amount of cementation, and the porosity loss by compaction comprises determining the post cementation porosity of the carbonate reservoir as an excess of the depositional porosity over a sum of the mud content percentage, the amount of cementation, and the porosity loss by compaction.

6. The computer-implemented method of claim 1, further comprising controlling a drilling system in the subterranean region based on the post cementation porosity of the carbonate reservoir.

7. A non-transitory, computer-readable medium storing one or more instructions executable by a computer system to perform operations comprising:
receiving, by data processing apparatus, petrographic data of a carbonate reservoir in a subterranean region;
determining, by the data processing apparatus, mud content percentage of the carbonate reservoir based on the petrographic data;
determining, by the data processing apparatus and using a model modeling effects of compaction and cementation on depositional porosities in carbonate rocks, a depositional porosity of the carbonate reservoir based on the mud content percentage;
determining, by the data processing apparatus, an interparticle porosity based on the mud content percentage;
determining, by the data processing apparatus, an amount of cementation of the carbonate reservoir;
determining, by the data processing apparatus, a post-cementation porosity of the carbonate reservoir based on a difference between the interparticle porosity and the amount of cementation; and
determining, by the data processing apparatus and using the model and including a calculated porosity loss by compaction, a porosity loss by compaction of the carbonate reservoir based on a difference between the post-cementation porosity and a final interparticle porosity, including determining the final interparticle porosity measured by point counting of thin sections of the carbonate rocks, and wherein determining the porosity loss by compaction is based on the mud content percentage.

8. The non-transitory, computer-readable medium of claim 7, wherein determining a depositional porosity of the carbonate reservoir based on the mud content percentage comprises determining the depositional porosity of the carbonate reservoir based on the mud content percentage according to an empirical relation between the depositional porosity and the mud content percentage.

9. The non-transitory, computer-readable medium of claim 8, wherein the empirical relation between the depositional porosity and the mud content percentage is obtained based on data fitting of depositional porosity and mud content data of a second carbonate reservoir.

10. The non-transitory, computer-readable medium of claim 7, wherein determining a post cementation porosity of the carbonate reservoir based on the depositional porosity, the mud content percentage, the amount of cementation, and the porosity loss by compaction comprises determining the post cementation porosity of the carbonate reservoir as an excess of post-cementation porosity over the porosity loss by compaction.

11. The non-transitory, computer-readable medium of claim 7, wherein determining a post cementation porosity of the carbonate reservoir based on the depositional porosity, the mud content percentage, the amount of cementation, and the porosity loss by compaction comprises determining the post cementation porosity of the carbonate reservoir as an excess of the depositional porosity over a sum of the mud content percentage, the amount of cementation, and the porosity loss by compaction.

12. The non-transitory, computer-readable medium of claim 7, wherein the operations further comprise controlling a drilling system in the subterranean region based on the post cementation porosity of the carbonate reservoir.

13. A computer-implemented system, comprising:
a computer memory; and
a hardware processor interoperably coupled with the computer memory and configured to perform operations comprising:
receiving, by data processing apparatus, petrographic data of a carbonate reservoir in a subterranean region;
determining, by the data processing apparatus, mud content percentage of the carbonate reservoir based on the petrographic data;
determining, by the data processing apparatus and using a model modeling effects of compaction and cementation on depositional porosities in carbonate rocks, a depositional porosity of the carbonate reservoir based on the mud content percentage;
determining, by the data processing apparatus, an interparticle porosity based on the mud content percentage;
determining, by the data processing apparatus, an amount of cementation of the carbonate reservoir;
determining, by the data processing apparatus, a post-cementation porosity of the carbonate reservoir based on a difference between the interparticle porosity and the amount of cementation; and
determining, by the data processing apparatus and using the model and including a calculated porosity loss by compaction, a porosity loss by compaction of the carbonate reservoir based on a difference between the post-cementation porosity and a final interparticle porosity, including determining the final interparticle porosity measured by point counting of thin sections of the carbonate rocks, and wherein determining the porosity loss by compaction is based on the mud content percentage.

14. The computer-implemented system of claim 13, wherein determining a depositional porosity of the carbonate reservoir based on the mud content percentage comprises determining the depositional porosity of the carbonate reservoir based on the mud content percentage according to an empirical relation between the depositional porosity and the mud content percentage.

15. The computer-implemented system of claim 14, wherein the empirical relation between the depositional porosity and the mud content percentage is obtained based on data fitting of depositional porosity and mud content data of a second carbonate reservoir.

16. The computer-implemented system of claim 13, wherein determining a post cementation porosity of the carbonate reservoir based on the depositional porosity, the mud content percentage, the amount of cementation, and the porosity loss by compaction comprises determining the post cementation porosity of the carbonate reservoir as an excess of post-cementation porosity over the porosity loss by compaction.

17. The computer-implemented system of claim 13, wherein determining a post cementation porosity of the carbonate reservoir based on the depositional porosity, the mud content percentage, the amount of cementation, and the porosity loss by compaction comprises determining the post cementation porosity of the carbonate reservoir as an excess of the depositional porosity over a sum of the mud content percentage, the amount of cementation, and the porosity loss by compaction.

* * * * *